United States Patent [19]

Glazer

[11] 4,252,616
[45] Feb. 24, 1981

[54] WATER DISTILLATION APPARATUS AND METHOD

[76] Inventor: Howard Glazer, 9804 Reistertown Rd., Owings Mills, Md. 21117

[21] Appl. No.: 883,243

[22] Filed: Mar. 3, 1978

[51] Int. Cl.³ .............................. B01D 3/02; C02F 1/04
[52] U.S. Cl. .......................................... 203/10; 203/2; 203/22; 202/176; 202/177; 202/180; 202/181; 165/164
[58] Field of Search ................ 202/180, 181, 176, 177, 202/235, 202, 160; 165/164; 203/10, 11, 2, 22, DIG. 17, DIG. 16, 98

[56] References Cited

U.S. PATENT DOCUMENTS

| | | | |
|---|---|---|---|
| 2,079,897 | 5/1937 | Brown | 202/DIG. 17 |
| 2,341,872 | 2/1944 | Kasold | 203/DIG. 16 |
| 2,617,634 | 11/1952 | Jendrassik . | |
| 3,055,810 | 9/1962 | Skow | 202/202 |
| 3,340,167 | 9/1967 | Weiss | 202/180 |
| 3,351,536 | 11/1967 | Fox | 202/202 |
| 3,473,381 | 10/1969 | Allen | 73/313 |
| 3,532,606 | 10/1970 | Sibert | 202/180 |
| 3,694,321 | 9/1972 | Marovich et al. | 202/177 |
| 3,696,003 | 10/1972 | Fitch et al. | 202/160 |
| 3,838,016 | 9/1974 | Powers | 202/202 |
| 3,896,004 | 7/1975 | Rodgers | 202/176 |
| 3,935,077 | 1/1976 | Dennison | 202/180 |
| 3,980,526 | 9/1976 | Kirschmann | 202/180 |
| 4,045,293 | 9/1977 | Cooksley | 202/181 |
| 4,110,170 | 8/1978 | Kirschmann | 202/180 |

*Primary Examiner*—Wilbur L. Bascomb, Jr.
*Attorney, Agent, or Firm*—Irvin A. Lavine

[57] ABSTRACT

A water distillation apparatus having a feed water pre-heater, an evaporator tank, and a storage tank. The storage tank has an upper surface and depending walls, the pre-heater and evaporator tank being on the upper surface, and extending, with the other components, to approximately the same height, all components being within the periphery of the walls. A mixing vessel including a level controlling overflow pipe receives water from the pre-heater, and a short, straight, large diameter conduit connects the mixing vessel and evaporator tank. The mixing vessel contains a valve to drain it and the evaporator tank. The pre-heater comprises two dished elements in facing relation, with a divider plate between them, the elements being joined at their peripheries. A serpentine path is provided in each of the two spaces of the pre-heater, formed by a pair of L-shaped separators extending linearly from one end of the space to a point spaced from the other end.

30 Claims, 8 Drawing Figures

WATER DISTILLATION APPARATUS AND METHOD

BACKGROUND OF THE INVENTION

The present invention relates to distillation apparatus, and method.

Distillation apparatus has been provided for many years, particularly for providing improved quality of water, such as water for drinking. Such distillation apparatus has typically taken the form of a feed water pre-heater which is connected to an evaporator tank. The evaporator tank has a heater, such as an electric heater, which causes the water to boil. The resulting steam is passed through the pre-heater, where it is condensed, imparting heat to the feed water, and raising the temperature of the feed water. The evaporation of water in the evaporator tank generates steam which is pure, with a resulting increasing concentration of the dissolved matters contained in the water in the evaporator tank, thus leading to the buildup of scale. Scale buildup is undesirable, and leads to such undesirable effects as coating of various parts of the apparatus, including the small passages, leading to a closing off of some passages as the scale buildup continues.

The problem of scale buildup has been recognized in the prior art. Skow, U.S. Pat. No. 3,055,810 provides for the continuous drain of water from the evaporator tank, to some waste discharge, such as a sewer. This is a wasteful procedure, and is particularly undesirable where the supply of water is either limited, or expensive, or both, and energy is expensive.

Another recognition of the problem in the prior art is provided in Kirschmann, U.S. Pat. No. 3,980,526, wherein rods are provided in small passageways, with mean to vibrate the rods, so as to attempt to provide a mechanical vibration or abrasion in the passages, so as to remove scale as it is built up.

Another problem with water distillation apparatus has been that the temperature of the condensate, or condensed steam, has been undesirably high. In Skow, U.S. Pat. No. 3,055,810, a refrigeration apparatus was provided in the storage tank, which received the condensed steam, in order to lower the temperature to the desired degree, as for drinking.

SUMMARY OF THE INVENTION

Water distillation apparatus in accordance with the present invention includes an evaporator tank and a feed water heater, together with a storage tank for the distilled water. A water mixing vessel is provided, which receives feed water from the preheater, the water mixing vessel being provided with an overflow for controlling water levels both in the mixing vessel and in the evaporator tank. The overflow means in the mixing vessel is continuously connected to a drain, and a short straight and large diameter conduit connects the mixing vessel with the evaporator tank. The water in the mixing vessel is at a lower temperature than the temperature of the water in the evaporator tank, and the boiling of the water in the evaporator tank agitates it, and these two factors tend to cause a portion of the water in the evaporator tank to move into the mixing vessel, through the conduit, where the water from the evaporator tank mixes with the water in the mixing vessel which came from the feed water heater, and some water then passes to drain through the overflow means. The water storage tank is relatively large, of rectangular cross-section, and has an upper surface on which are supported the components of the distillation apparatus, including the preheater, the evaporator tank, the mixing vessel, and various switches, filter and valves. All of these components are within the periphery of the side walls of the storage tank, and extend to approximately the same heighth, so as to provide a very compact organization. The preheater is constructed of two dished elements in facing relationship, with peripherally extending flanges, an imperforate divider plate between the flanges so as to divide the preheater into two spaces, a water space and a steam space. Water is introduced at a water inlet, which is adjacent the steam outlet, and steam is introduced at a steam inlet, which is adjacent the water outlet. Within each space, a serpentine path is provided by linearly extending separators, each in the form of an L-shaped element, with one leg thereof adjacent the divider plate, and the other leg extending from the divider plate to the dished element. The L-shaped elements begin at one end of the preheater and extend to a point slightly removed from the other end, so as to provide a passage around the end thereof. Legs of these L-shaped separators are placed in opposed juxtaposition on either side of the divider plate.

The temperature of the distilled water or condensed steam, delivered to the storage tank, is comparatively low, this being achieved by regulation of the outlet temperature from the preheater. Regulation is obtained either by manually setting of an outlet valve from the pre-heater, or by the utilization of a regulator valve controlled by the sensed temperature of the discharge water from the preheater. The high temperature of the feed water discharged by the preheater results from substantial extraction of heat from the steam discharged by the evaporator tank, and the lowering of the temperature of the condensate.

Among the objects of the present invention are to provide a water distillation apparatus and method wherein operation for extended lengths of time are achieved, with minimum scale buildup, and without high loss of water through drainage. Another object of the invention is the provision of a water distillation apparatus which is of compact construction, wherein the parts are sized and oriented to each other in a manner to provide efficient use of space within a minimum envelope volume. A further object is to provide a water distillation apparatus having a unique mixing vessel for mixing feed water and water which has passed to the evaporator tank, and to a related method. A still further object is to provide a unique and improved and inexpensive preheater construction.

Other objects and many of the attendent advantages of the present invention will become readily apparent from the following specification and drawings.

DESCRIPTION OF THE PREFERRED EMBODIMENT

Figure 1:
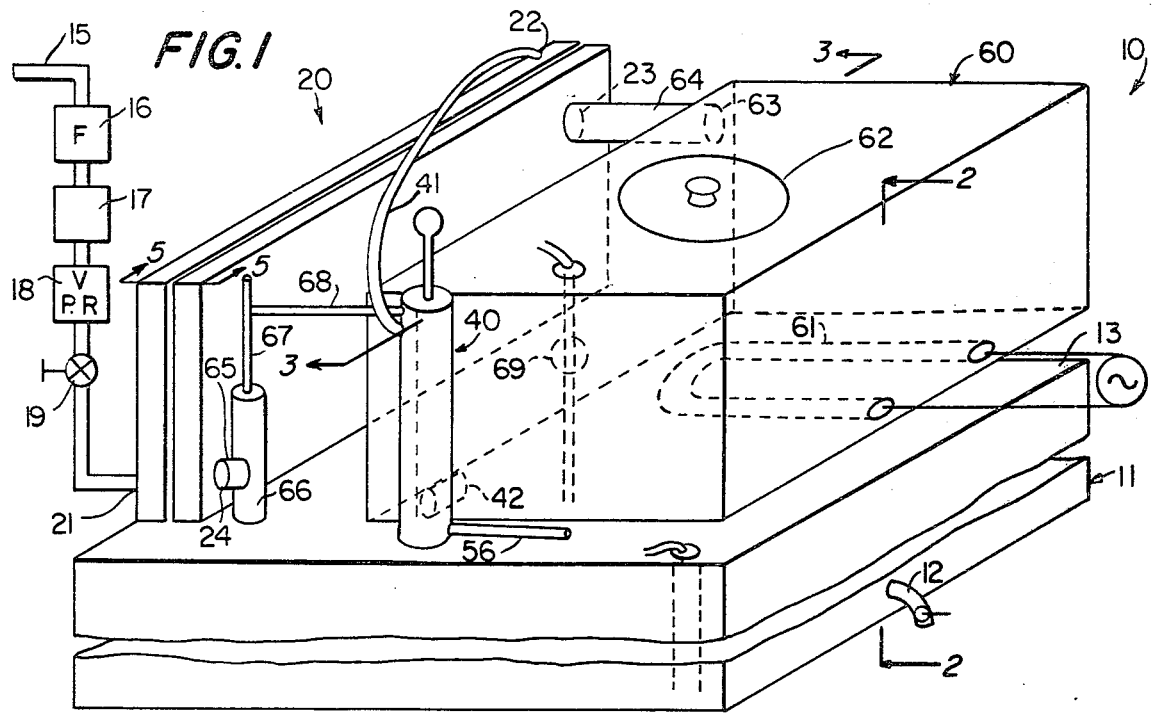
FIG. 1 is a perspective view of a water distillation apparatus in accordance with the present invention, with parts removed, broken away, and partly schematic.

Referring now to the drawings, wherein like or corresponding reference numerals are used for like or corresponding parts throughout the several views, there is shown in FIG. 1 a water distillation apparatus 10 comprising a water storage tank 11 having an outlet faucet 12 with a valved handle, of known construction. The water storage tank 11 is of generally rectangularly cross-section, having an upper plate 13, providing an upper surface, from which the walls depend.

Located on the upper surface 13, and within the periphery of the walls of the water storage tank 11 which depend from the upper surface 13 are the other components of the water distillation apparatus 10. These components include, principally, a water inlet pipe 15, a filter 16, a solenoid on-off valve 17 which is controlled by an on-off switch (not shown) and a pressure regulating valve 18. Also provided is a metering valve 19, which is manually operated. The components 16, 17, 18 and 19 are shown schematically in FIG. 1 for clarity, but actually are located in a different position, to be set forth hereinbelow.

A feed water pre-heater 20 is provided, having a water inlet 21 and a water outlet 22, there being a water path between them, as set forth below. There is also provided in the pre-heater 20 a steam inlet 23 and a condensate outlet 24, connected to a steam path in the pre-heater 20. A mixing vessel 40 is provided, connected to the pre-heater 20 by a water pipe 41. A conduit 42 connects the mixing vessel 40 to an evaporator tank 60. Evaporator tank 60 includes an electric heater 61, a removable cover 62, and an outlet port 63 which is connected by a steam pipe 64 to the steam inlet 23 of pre-heater 20. The outlet 24 of pre-heater 20 is connected by a pipe 65 to a connector 66, in the form of an upstanding hollow cylinder, the lower end of which extends to an opening in the upper wall 13 of water storage tank 11, so as to provide for the discharge of condensed steam from the steam path of pre-heater 20 into the water storage tank 11. Entrapped gases are vented through vent pipe 67, shown extending vertically, and a generally horizontally extending connecting vent pipe 68 extends between the mixing vessel 40 and vent pipe 67.

Figure 2:
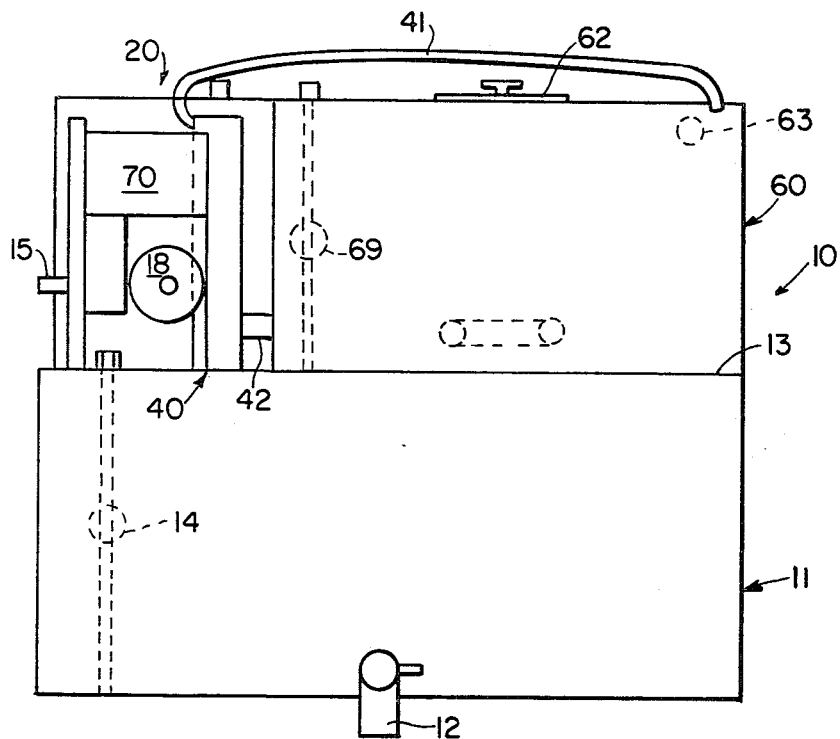
FIG. 2 is an elevational view taken along the line 2—2 of FIG. 1.

In FIG. 2, there is shown the water storage tank 11 of the water distillation apparatus 10, with the evaporator tank 60 positioned on the upper surface thereof. There also may be seen the pre-heater 20 and the mixing vessel 40, together with water pipe 41 extending between pre-heater 20 and mixing vessel 40 and conduit 42 extending between mixing vessel 40 and evaporator tank 60. To the left of the evaporator tank 60, and forwardly of the pre-heater 20, a space is provided in which the aforementioned mixing vessel 40 and connector 66 are located. Also located in this space and not shown in FIG. 1 for purposes of clarity, are the filter 16, on-off solenoid valve 17 and pressure regulating valve 18. Also provided in this space are electrical components, including relays 70 forming part of an electrical circuit of conventional arrangement. The electrical circuitry, not shown, includes switches connected to level sensing float 14 in the water storage tank 11 and level sensing float 69 in the evaporator tank 60. The floats 14 and 69 are movable with the water level on guide rods, and include magnets which operate reed switches, in known manner.

As will be apparent from FIG. 2, the pre-heater 20 and the evaporator tank 60 extend to approximately the same heighth, being located on the upper surface 13 of the water storage tank 11, and, as previously noted, within the periphery of the upper surface 13, that is, within the periphery of the walls of water storage tank 11 depending from the upper surface 13. Further, the additional components, including relays 70, filter 16, valves 17 and regulating valve 18 are located in the aforementioned space to the left of evaporator tank 60, and forwardly of pre-heater 20, so that substantially all of the components of the entire distillation apparatus 10 are included, laterally, within the margins of the storage tank 11, and extending to a substantially uniform heighth above the upper surface 13 of water tank 11.

Figure 3:
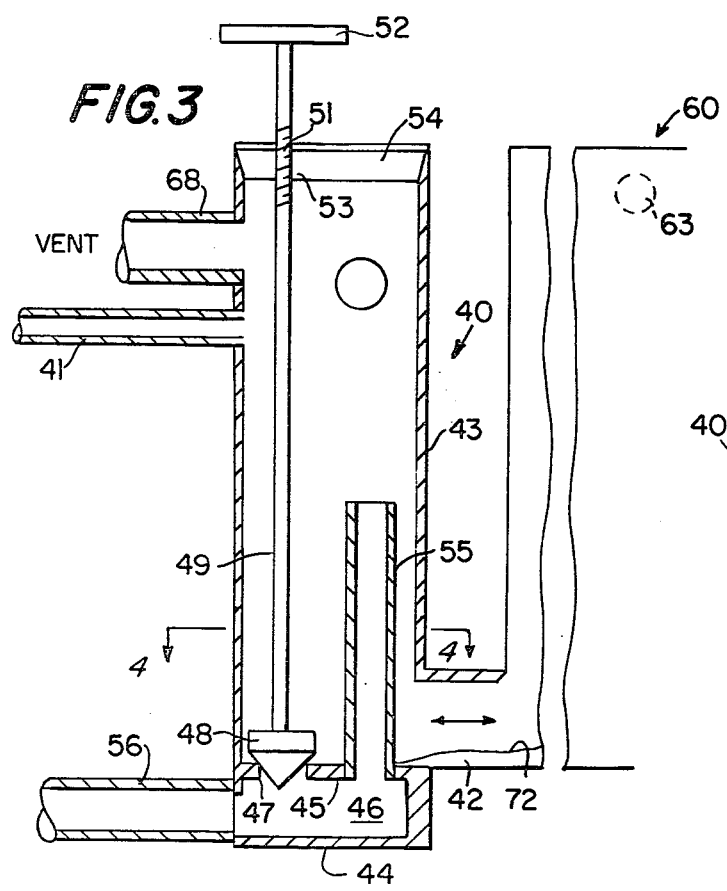
FIG. 3 is a cross-sectional view taken on the line 3—3 of FIG. 1, with parts removed, and being partially schematic.
Figure 4:
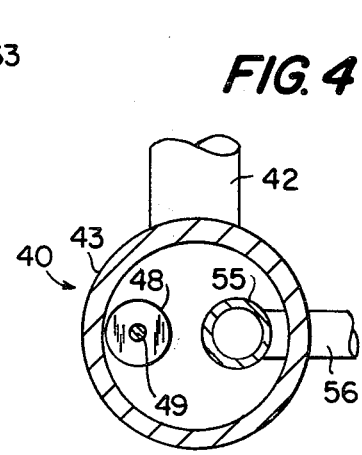
FIG. 4 is a cross-sectional view taken along the line 4—4 of FIG. 3.

Referring now to FIG. 3, there may be seen the mixing vessel 40 and the evaporator tank 60, the latter being broken away, with parts removed. The mixing vessel 40 comprises an upstanding tube 43 having a bottom wall 44 transversely over the axis of tube 43, and an intermediate wall 45 parallel to the bottom wall 44 and spaced therefrom, so as to provide a chamber 46 therebetween. The intermediate wall 45 is at or below the level of the bottom 72 of evaporator tank 60. An orifice 47 is provided in the intermediate wall 45, and a valve 48 is provided for opening and closing the drain orifice 47. A valve operator includes a rod 49, threaded at 51 near its upper end, and having a handle 52, the threads 51 cooperating with internal threads 53 of a cap 54 which is suitably secured to the top of the upstanding tube 43. The valve stem 49 will be seen to extend parallel to the axis of the upstanding tube 43. Also extending parallel to, and within, upstanding tube 43 is an overflow pipe 55, having its upper end open and its lower end extending through an orifice in the intermediate wall 45, so as to thereby communicate with the chamber 46. Also communicating with the chamber 46 is a drain tube 56, leading to a connection to a sewer line, or the like. Communicating with the upstanding tube 43 and with the mixing vessel 40 are the gas vents 68 and the feed water pipe 41; it will be appreciated that drain pipe 56, water feed pipe 41 and gaseous vent pipe 68 are shown displaced in FIG. 3 from their normal positions, for clarity. However, in FIG. 4, the relative positions of the conduit 42 and drain pipe 56 are shown in their preferred relationship. Also shown in FIG. 4 is the position of overflow pipe 55 and valve stem 49, remote from the end of conduit 42 connected to the upstanding pipe 43.

The conduit 42 will be seen in FIG. 3 to have one end connected with the evaporator tank 60 and the other end connected with the mixing vessel 40, so as to communicate between vessel 40 and tank 60. Conduit 40 is independent of overflow pipe 55, and the conduit 42 will be seen to communicate the evaporator tank 60 with drain 46 through the mixing vessel 40 and overflow pipe 55. Conduit 42 is a straight cylinder of short length and large diameter in the preferred embodiment, the length being approximately $\frac{1}{2}$ inch and the diameter being approximately $\frac{5}{8}$ inch. Thus, the length is approximately equal to the diameter to provide for minimum impediment to flow or movement of water between mixing vessel 40 and the evaporator 60. It will be noted further, that there are no impediments to the free flow of water through the conduit 42 at either end thereof.

Figure 5:
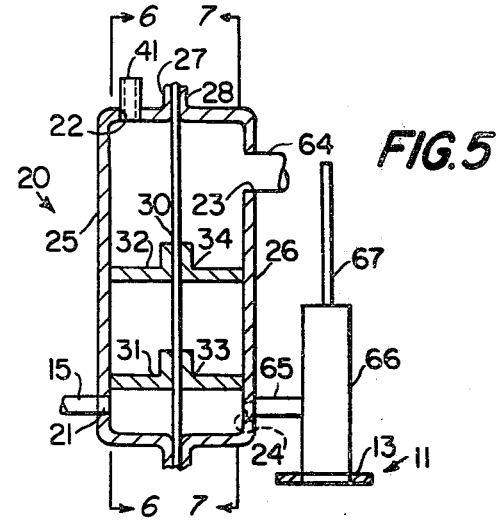
FIG. 5 is a cross-sectional view taken on the line 5—5 of FIG. 1.

Referring now to FIG. 5, there is shown the pre-heater 20, including dished elements 25 and 26, of substantially identical shape, provided with peripherally extending flanges 27 and 28, respectively. There is connected to the water inlet 21 the inlet pipe 15, and to the water outlet 22 the water pipe 41. Shown connected to the steam inlet 23 is the steam pipe 64 leading from evaporator tank 60, and the pipe 65 is shown connected to the outlet 24 from the steam path. Also shown in FIG. 5 is the connector 66 with vent pipe 67, the connector 66 providing communication through the top of the water storage tank 11.

Between the facing, dished elements 25 and 26 is a divider plate 30 which extends between the flanges 27 and 28. The flanges 27 and 28 and the periphery of divider plate 30 may be joined together, as by suitable welding techniques. The divider plate 30 serves to divide the interior of pre-heater 20 into a water path and a steam path.

Figure 6:
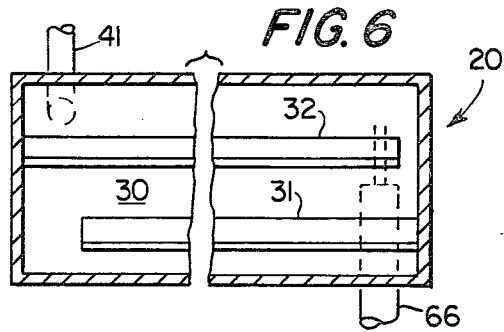
FIG. 6 is a cross-sectional view taken on the line 6—6 of FIG. 5.
Figure 7:
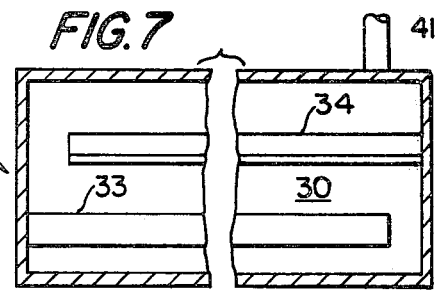
FIG. 7 is a cross-sectional view taken on the line 7—7 of FIG. 5.

Serpentine water and steam paths are provided within the pre-heater 20, in order to extend the time of passage of water and steam therewithin. Thus, as shown in FIGS. 5 and 6, linearly extending separators 31 and 32 are provided in the water path of pre-heater 20. These are L-shaped in cross-section, having one leg adjacent to the divider plate 30, and the other leg extending between divider plate 30 and the dished element 25. As seen in FIG. 6, the separator 31 extends from the right hand end of the divider plate 30, above the water inlet 21, to a point spaced from the opposite end of divider plate 30. The separator 32 extends from the left end of plate 30 to a point spaced from the right end thereof, so that there is thereby provided the above noted serpentine path from the water inlet 21 to the water outlet 22.

A serpentine steam path is provided by the L-shaped, linearly extending separators 33 and 34. The upstanding leg of the separator 33 is in opposed juxtaposition with the upstanding leg of separator 31, and a similar relationship exists for the upstanding legs of separators 32 and 34. The separators provide the aforementioned serpentine paths for the water and steam, and as will be appreciated from FIG. 5, the water inlet 21 is adjacent the steam path outlet 24, and the water outlet 22 is adjacent the steam inlet 23. This construction permits maximum extraction of heat from the steam, so as to lower its temperature to the greatest extent, and also provides for substantial high temperature of the feed water after it has passed through the pre-heater 20.

The temperature of the water supplied to the mixing vessel 60 is controlled by regulation of the metering valve 19, so that by permitting a lesser amount of water to flow into the pre-heater 20, the more heat will be extracted from the steam, and thereby the higher the temperature of the water leaving the pre-heater 20 will be. In practice, a temperature of between 175° and 195° F. is preferred in the mixing vessel 40.

Figure 8:
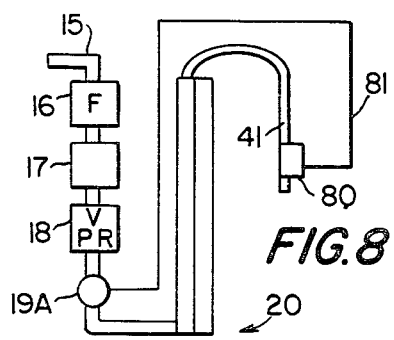
FIG. 8 is a schematic, partial view showing a modification of the apparatus as shown in FIG. 1.

Alternatively, as shown in FIG. 8, a temperature sensing device 80 may be provided to sense the temperature of water in the outlet pipe 41 from pre-heater 20, temperature sensor 80 being connected by a suitable conductor 81 to a temperature controlled metering valve 19A. This construction will serve to automatically control, within a desired narrow range, the temperature of the water discharged from pre-heater 20.

In operation, feed water is conducted through filter 16 and valves 17, 18 and 19, into the pre-heater 20, where it passes through the serpentine water path, being discharged therefrom and conducted by the pipe 41 to the mixing vessel 40. With the valve 48 closed, water will fill mixing vessel 40 and evaporator tank 60 to the level of the upper end of overflow pipe 55, and additional water supplied will overflow through the overflow pipe 55, to chamber 46, and thence through drain pipe 56. When the proper water level has been achieved in evaporator tank 60, this will be sensed by float 69, and the circuitry will cause heater 61 to be energized. When water is boiled, and steam exits through steam pipe 64, it will pass through the steam path of the pre-heater 20, and will be discharged through connector 66 into the water storage tank 11. The float 14 in water storage tank 11 will control the operation, upon the reaching of a satisfactory level of distilled water therein, and shut off the still, including valve 17 and heater 61.

When the water is boiled in the evaporator tank 60, there is caused a movement of some of the water in the evaporator tank 60 through the conduit 42 and into the mixing vessel 40, where the water from the evaporator tank 60 will mix with the incoming feed water which is already present in the mixing vessel 40. This movement is effected because of the agitation of the water in the evaporator tank 60, the movement of the water level in tank 60 up and down, and the temperature differential between the water in evaporator tank 60 and the water in mixing vessel 40. The agitation of water in evaporator tank 60 by the heater 61 causes some pulsing of the water therein, which causes movement, as aforementioned, of water through the conduit 42, with some water from the mixing vessel 40 then passing to drain. This serves to permit operation of the distillation apparatus 10 for an extended period of time with little scale build up or improved operation in that regard, due to the conducting of some water from the evaporator tank 60 to drain. This is done in a somewhat intermittent fashion, thereby avoids a continuous drain from the evaporator tank 60, which would be wasteful of both water and energy.

This forcing of the water from evaporator tank 60 into mixing vessel 40 is enhanced by the construction, above noted, of conduit 42, which is very short, and of large diameter, is straight, and has no impediments to water flow at either end.

The herein disclosed distillation apparatus, and related method, provide for longer operation, with reduced water and energy loss. The construction, including the placement of component parts, provides for a compact and efficient arrangement, easy to manufacture, and of generally pleasing and desirable configuration. The herein disclosed pre-heater may be used separately, and in other installations.

It will be obvious to those skilled in the art that various changes may be made without departing from the spirit of the invention, and therefore the invention is not limited to what is shown in the drawings and described in the specification but only as indicated in the appended claims.

I claim:

1. Distillation apparatus for water or the like comprising:
   (a) an evaporator tank, (b) means for heating liquid in said evaporator tank, (c) a feed water pre-heater comprising a water path and a steam path, each having an inlet and an outlet, (d) a storage tank, (e) means for connecting the evaporator tank to the pre-heated steam path inlet and for connecting the steam path outlet to the storage tank (f) water mixing vessel means for mixing feed water and evaporator water, (g) conduit means for connecting the water path outlet of the pre-heater to the water mixing vessel means, (h) said water mixing vessel means comprising overflow means, (i) means for continuously connecting said overflow means to drain, and (j) conduit means independent of said overflow means having one end connected to said evaporator tank and the other end connected to said mixing vessel for communicating the water in said evaporator tank with drain through said mixing vessel and said overflow means and for supplying water to the evaporator from said water mixing vessel means.

2. The distillation apparatus of claim 1, said last mentioned conduit means being a straight cylinder of short length and large diameter.

3. The distillation apparatus of claim 2, said conduit means having a length approximately equal to the diameter thereof.

4. The distillation apparatus of claim 1, wherein said evaporator tank and mixing vessel are free of impediments to flow of water into said last mentioned conduit means.

5. The distillation apparatus of claim 1, wherein said evaporator tank comprises means for forcing water through said last mentioned means to said mixing vessel.

6. The distillation apparatus of claim 5, said last mentioned means comprising said heating means.

7. The distillation apparatus of claim 1, and means for controlling the temperature of water entering said water mixing vessel.

8. The distillation apparatus of claim 7, and means comprising valve means for regulating the volume of water passing through said water path of said pre-heater.

9. The distillation apparatus of claim 8, said valve means being manually operable.

10. The distillation apparatus of claim 8, and further comprising means for sensing the temperature of the water flowing from the pre-heater and for controlling said valve means.

11. The distillation apparatus of claim 1, said storage tank having an upper surface, said evaporator tank, said pre-heater and said mixing vessel being located on said upper surface and within the periphery of said storage tank.

12. The distillation apparatus of claim 11, said evaporator tank, said pre-heater and said mixing vessel extending to approximately the same height from said storage tank upper surface.

13. The distillation apparatus of claim 1, said water mixing vessel means comprising an upstanding tube having a bottom wall transversely of the tube axis and an intermediate wall parallel thereto and spaced therefrom to provide a chamber therebetween, the intermediate wall being at or below the bottom of said evaporator tank, an orifice in said intermediate wall, and a valve for closing said orifice, and manual valve operator means connected to said valve and operable from outside the upstanding tube, and means for communicating said chamber with drain.

14. The distillation apparatus of claim 13, said valve operator means comprising a valve stem extending parallel to said tube, said tube having a cap at its upper end, said stem extending through said tube cap, and means on said cap and valve stem for adjusting the axial position of said stem to open and close said valve.

15. The distillation apparatus of claim 13, said overflow means comprising a pipe within said tube having an open top at a level below the top of said tube, said pipe extending upwardly from said intermediate wall and communicating therethrough with said chamber.

16. The distillation apparatus of claim 15, said pipe being spaced remotely from the said other end of said conduit means connecting said mixing vessel to said evaporator tank.

17. The distillation apparatus of claim 1, said pre-heater having the water path inlet adjacent the steam path outlet and having the water path outlet adjacent the steam path inlet.

18. The distillation apparatus of claim 17, said pre-heater comprising:
first and second dished elements in facing relationship, and a divider plate between them,
said divider plate providing a water space between it and one said dished element and providing a steam space between it and the other said dished element.

19. The distillation apparatus of claim 18, said dished elements comprising peripherally extending flanges, said divider plate extending between and joined to said flanges.

20. The distillation apparatus of claim 18, and means for providing a serpentine water path and a serpentine steam path comprising linearly extending separator means in each said water space and steam space, each extending between said divider plate and the adjacent dished element, and means providing for fluid flow from one side of said separator means to the other.

21. The distillation apparatus of claim 20, wherein each said separator means extends from one end of said divider plate to a point spaced from the opposite end thereof.

22. The distillation apparatus of claim 21, said separator means comprising linearly extending elements of L-shape in cross-section.

23. The distillation apparatus of claim 22, a leg of a water space separator element being in opposed juxtaposition with a leg of a steam space separator element, said last mentioned legs being on opposite sides of said divider plate.

24. In distillation apparatus having a pre-heater with water and steam paths, an evaporator tank for receiving water which has passed through the pre-heater and for generating steam which is passed to the pre-heater, and a storage tank for receiving condensate from the pre-heater,
a vessel comprising an upstanding tube having a bottom wall transversely of the tube axis and an intermediate wall parallel thereto and spaced therefrom to provide a chamber therebetween, the intermediate wall being at or below the bottom of said evaporator tank, an orifice in said intermediate wall, a valve for closing said orifice, valve operator means connected to said valve and openable from outside said upstanding tube, and means for communicating said chamber with drain means.

25. Distillation apparatus as set forth in claim 24, said valve operator comprising a valve stem extending parallel to said tube, said tube having a cap at its upper end, said stem extending through said tube cap, and means on said cap and valve stem for adjusting the axial position of said stem to open and close said valve.

26. Distillation apparatus as set forth in claim 24, said overflow means comprising a pipe within said tube having an open top at a level below the top of said tube, said pipe extending upwardly from said intermediate wall and communicating therethrough with said chamber.

27. Distillation apparatus as set forth in claim 26, said pipe being spaced remotely from the said other end of said conduit means connecting said mixing vessel to said evaporator tank.

28. In a method of operating a still, wherein feed water is passed through a pre-heater and into an evaporator tank, wherein steam from the evaporator tank is passed through the pre-heater, the steps of:

(a) providing a water mixing vessel,
(b) conducting the feed water from the pre-heater into the mixing vessel,
(c) conducting feed water from the mixing vessel to the evaporator tank through a conduit,
(d) providing an over flow path from the mixing vessel to drain,
(e) causing a portion of the water from the evaporator tank to pass into said mixing vessel through a conduit and to mix therein with feed water,
(f) causing a portion of said mixed water from said mixing vessel to discharge to drain through said over flow path,
(g) whereby to drain off a portion of said water from said evaporator tank.

29. The method of claim 28, wherein the water in the evaporator tank is heated to a higher temperature than the water in the mixing vessel.

30. The method of claim 28, wherein water is caused to pass into the mixing vessel from the evaporator tank by agitation of the water in the evaporator tank.

* * * * *